United States Patent [19]
Dempsey

[11] 3,943,512
[45] Mar. 9, 1976

[54] SIDELOBE LOCK-ON DISCRIMINATING METHOD FOR SEARCH-TRACK MONOPULSE RADAR

[75] Inventor: Donald Joseph Dempsey, Pennsauken, N.J.

[73] Assignee: RCA Corporation, New York, N.Y.

[22] Filed: Jan. 18, 1974

[21] Appl. No.: 434,374

[52] U.S. Cl. .............................. 343/7.4; 343/16 M
[51] Int. Cl.² .......................................... G01S 9/22
[58] Field of Search ........................ 343/7.4, 16 M

[56] References Cited
UNITED STATES PATENTS
3,772,695   11/1973   Hoffman ............................ 343/7.4

*Primary Examiner*—T. H. Tubbesing
*Attorney, Agent, or Firm*—Edward J. Norton; George J. Seligsohn

[57] ABSTRACT

Method using the difference in the value of the angle-error gradient exhibited by the mainlobe and any sidelobe antenna pattern of a monopulse radar to discriminate between mainlobe lock-on and sidelobe lock-on of a detected target.

4 Claims, 4 Drawing Figures

CONVENTIONAL MONOPULSE RADAR

CONVENTIONAL MONOPULSE RADAR

ANTENNA PATTERN

ANTENNA SERVO AND
SEARCH-TRACK CONTROL MEANS 32

ANTENNA SERVO AND
SEARCH-TRACK CONTROL MEANS 32

SIDELOBE LOCK-ON DISCRIMINATING METHOD FOR SEARCH-TRACK MONOPULSE RADAR

This invention relates to a monopulse radar operating technique and, more particularly, to an improved method for detecting the occurrence of sidelobe lock-on in a search-track monopulse radar.

As is known, in its search mode, the antenna of a search-track monopulse radar is slewed in azimuth and/or elevation until a target is detected, at which time the monopulse radar locks onto the detected target and switches over to its track mode. In its track mode, azimuth and/or elevation error signals proportional to the error between the pointing direction of the axis of the radar antenna and the azimuth and/or elevation of the locked-on target at any instant are developed and employed in a servo system to cause the radar antenna to track the locked-on target.

As is also known, in addition to a desired mainlobe radiation pattern, a monopulse radar antenna inherently also gives rise to undesired sidelobe radiation patterns. Thus, sidelobe lock-on, rather than mainlobe lock-on, of a detected target can occur in a monopulse radar, although this leads to erroneous determination of the position of the target. It is therefore usually necessary to detect the occurrence of unwanted sidelobe lock-on in a monopulse radar system, so that if it does occur, the monopulse radar may be switched back to its search mode and the target reacquired by the mainlobe.

The detection of sidelobe lock-on in search-track monopulse radar, prior to the present invention, has utilized the sidelobe to mainlobe antenna gain differences as the discriminant. However, this gain approach requires the existence of a broad beam auxiliary antenna to provide a reference for antenna gain comparisons. The signal from this auxiliary antenna also must be processed through a separate receiver channel. Thus, considerable extra equipment must be provided to implement this prior art gain approach for detecting sidelobe lock-on. Not only does this extra equipment add to the cost of a search-track monopulse radar, but many monopulse search-track radars have been constructed which cannot be readily modified to incorporate this extra equipment as part of the radar itself.

In accordance with the present invention, it is proposed to detect the occurrence of sidelobe lock-on in a search-track monopulse radar by making use of the differences in angle-error gradients which exist between the mainlobe and sidelobes. A sidelobe of a monopulse antenna is associated with an angle-error gradient which is significantly different (i.e.: higher volts/offset angle or lower volts/offset angle, depending on the specific configuration of the monopulse radar antenna) than that associated with the mainlobe of the antenna. Although this characteristic has been observed for years, no specific note has been taken of it nor has any known use been made of it. However, the angle-error gradient difference is great enough to allow its use as a practical sidelobe lock-on discriminant.

This and other features and advantages of the present invention will become more apparent from the following detailed description taken together with the accompanying drawing, in which.

Figure 1:
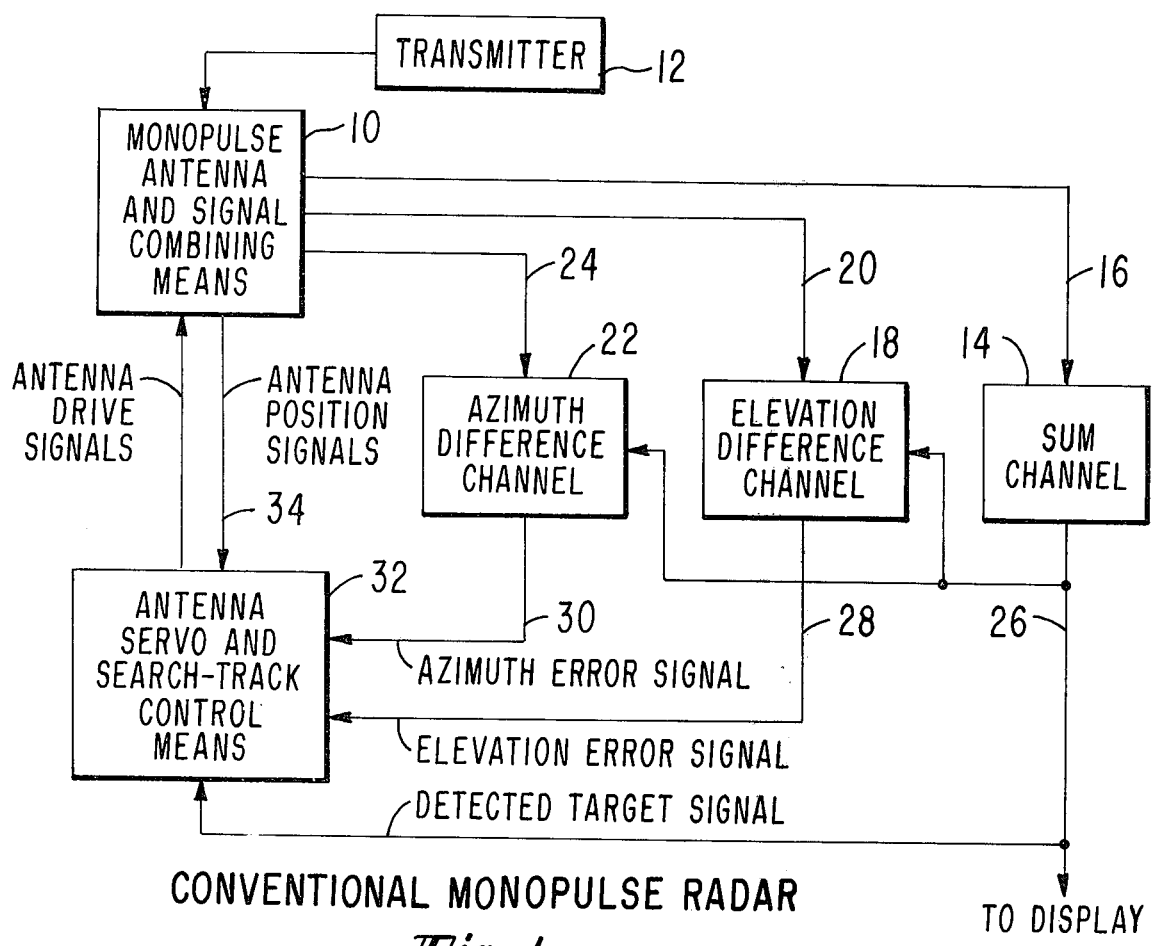
FIG. 1 is a functional block diagram of a conventional monopulse radar.

Referring now to FIG. 1, a conventional monopulse radar includes a monopulse antenna and signal combining means 10. As is known, the monopulse antenna usually comprises a paraboloid reflector and four feeds spaced from and symmetrically disposed about the axis of the reflector. Each of a series of pulses of wave energy, supplied by transmitter 12, is fed to and radiated in phase by all four antenna feeds as a single exploratory pulse. Radar echos received by the monopulse antenna are individually picked up by each of the four feeds, to thereby provide four separate feed signals. The signal combining means of block 10 combines these four feed signals in each of three separate ways. In particular, a sum signal (the sum of all four of these feed signals) is derived and applied as an input to sum channel 14 over connection 16. Further, an elevation difference signal (the difference between the sum of the top two feed signals and the sum of the bottom two feed signals) is derived and applied as an input to elevation difference channel 18 over connection 20. In addition, an azimuth difference signal (the difference between the sum of the left two feed signals and the sum of the right two feed signals) is derived and applied as an input to azimuth difference signal 22 over connection 24.

The output from sum channel 14, present on connection 26, manifests a detected target signal. The output from elevation difference channel 18, present on connection 28, manifests an elevation error signal. The output from azimuth difference channel 22, present on connection 30, manifests an azimuth error signal. The detected target signal on connection 26, which has a magnitude which is a function of the signal strength of the detected target picked up by the monopulse antenna, is applied as a control input to both elevation difference channel 18 and azimuth difference channel 22 for normalization purposes, as is known. The detected target signal on connection 26 is also used by the radar display, as is known. In addition, the detected target signal on connection 26 may be used as a control signal by antenna servo and search-track control by means of 32 for switching the radar from a search mode to a track mode when a target signal is detected, as is known.

When the radar is in its search mode, block 32 provides antenna drive signals to monopulse antenna and signal combining means 10 to slew the monopulse antenna in azimuth and/or elevation until a target signal is detected. In response to a detected target signal, the radar switches to its track mode, where it locks on to the detected target and thereafter tracks the target under the control of the elevation error signal present on connection 28 and the azimuth error signal present on connection 30. In particular, when in its track mode, the antenna drive signals for moving the monopulse antenna in azimuth and/or elevation are derived by servo means within antenna servo and search-track control means 32. In many cases, each servo means includes a computer which is programmed to respond to antenna position signals manifesting the actual position of the monopulse antenna at any time, received from block 10 over connection 34, as well as the elevation and azimuth error signals, to derive the appropriate antenna drive signals to cause the monopulse antenna to track the detected target, as is known in the art.

Figure 2:
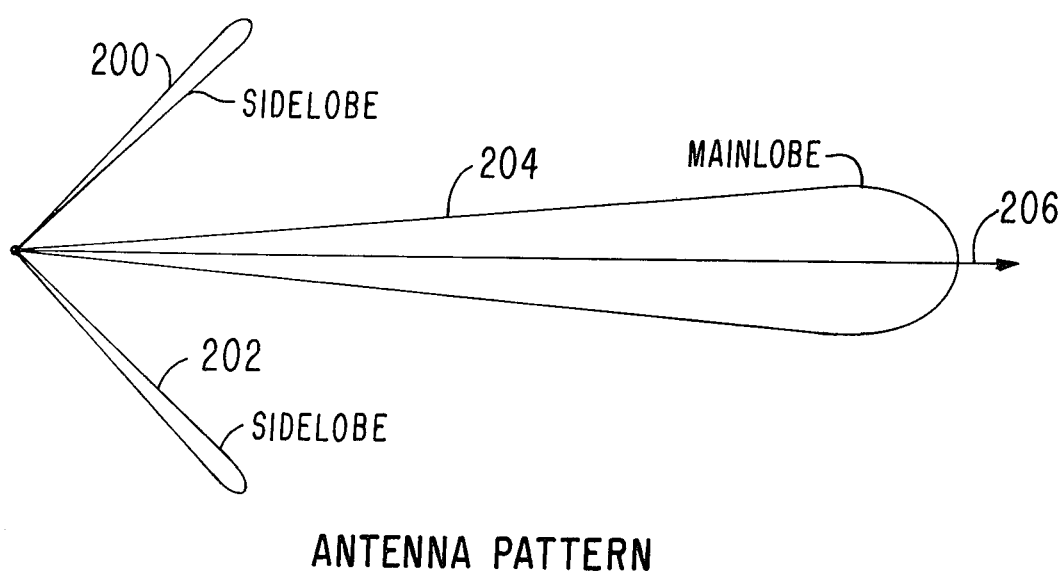
FIG. 2 illustrates the mainlobe and a pair of sidelobes of a composite (sum) antenna pattern of a monopulse radar.

Ideally, the composite (sum) radiation pattern of a monopulse antenna should consist of a single, highly directional, lobe which is symmetrical with respect to the pointing direction of the axis of the monopulse antenna. However, as shown in FIG. 2, in the real world all monopulse antennas include one or more pairs of undesired sidelobes 200 and 202 beside a desired single mainlobe 204, only the latter being symmetrical about the pointing direction 206 of the antenna. As shown in FIG. 2, neither of the sidelobes 200 and 202 is symmetrically disposed about the pointing direction 206 of the axis of the antenna. The mere presence of sidelobes, such as sidelobe 200 and 202, makes it possible that a searching monopulse radar might employ one of the sidelobes, rather than the desired mainlobe 204, to lock onto a detected target. Under such a sidelobe lock-on condition, the pointing direction 206 of the axis of the antenna is no longer the direction to the target, as in the desired mainlobe lock-on case. Furthermore, the relatively low gain of a sidelobe with respect to that of the mainlobe also makes sidelobe lock-on undesirable.

It is therefore important that means be provided for determining whether undesired sidelobe target lock-on or desired mainlobe target lock-on has been achieved and, in the case of undesired sidelobe target lock-on, for switching back to the radar search mode so that desired mainlobe target lock-on may be ultimately achieved.

As shown in FIG. 2, not only are the sidelobes 200 and 202 much smaller in size (lower signal gain) than mainlobe 204, but the respective shapes of the mainlobe 204 and either of the sidelobes 200 and 202 are not similar. The present invention makes use of this latter fact to discriminate between sidelobe lock-on and mainlobe lock-on.

In particular, as shown in FIG. 2, the angular beam width of mainlobe 204 is wider than the angular beam width of either sidelobe 200 or 202. This means that offsetting the pointing direction of the axis of monopulse antenna by a known incremental angle after a target has been detected and locked onto, results in a different error signal being developed if the radar antenna is in a desired mainlobe lock-on condition than if it is in an undesired sidelobe lock-on condition. Alternatively, if after lock-on of a detected target, the antenna is offset by that particular angular amount which results in a given incremental error signal being developed, the particular angular offset will be different if a desired mainlobe lock-on condition exists than if an undesired sidelobe lock-on condition exists.

The term "error gradient", as used herein, is defined as the magnitude of the error signal which results from a given angular offset in the pointing direction of the axis of the antenna with respect to the direction to a detected target. The term "angle gradient", as used herein, is defined as the magnitude of the angular offset in the pointing direction of the antenna axis with respect to the direction to a target required to produce an error signal having a given magnitude. The term "angle-error gradient", as used herein, is generic to both the terms error gradient and angle gradient, defined above. Both error gradient and angle gradient are a measure of the width of a lobe of an antenna pattern.

If the angle-error gradient for the mainlobe and/or sidelobe is known a priori, and the actual angle-error gradient of a locked-on detected target is measured, mainlobe lock-on and sidelobe lock-on can be differentiated from each other by comparing the measured angle-error gradient with the known angle-error gradients.

While the angle-error gradient of either or both the sidelobe and the mainlobe may be known, usually it is only the angle-error gradient of the mainlobe which is known. Therefore, in illustrating embodiments of the present invention in each of FIGS. 3 and 4, it is assumed that the known angle-error gradient is that of the mainlobe of the antenna pattern.

Figure 3:
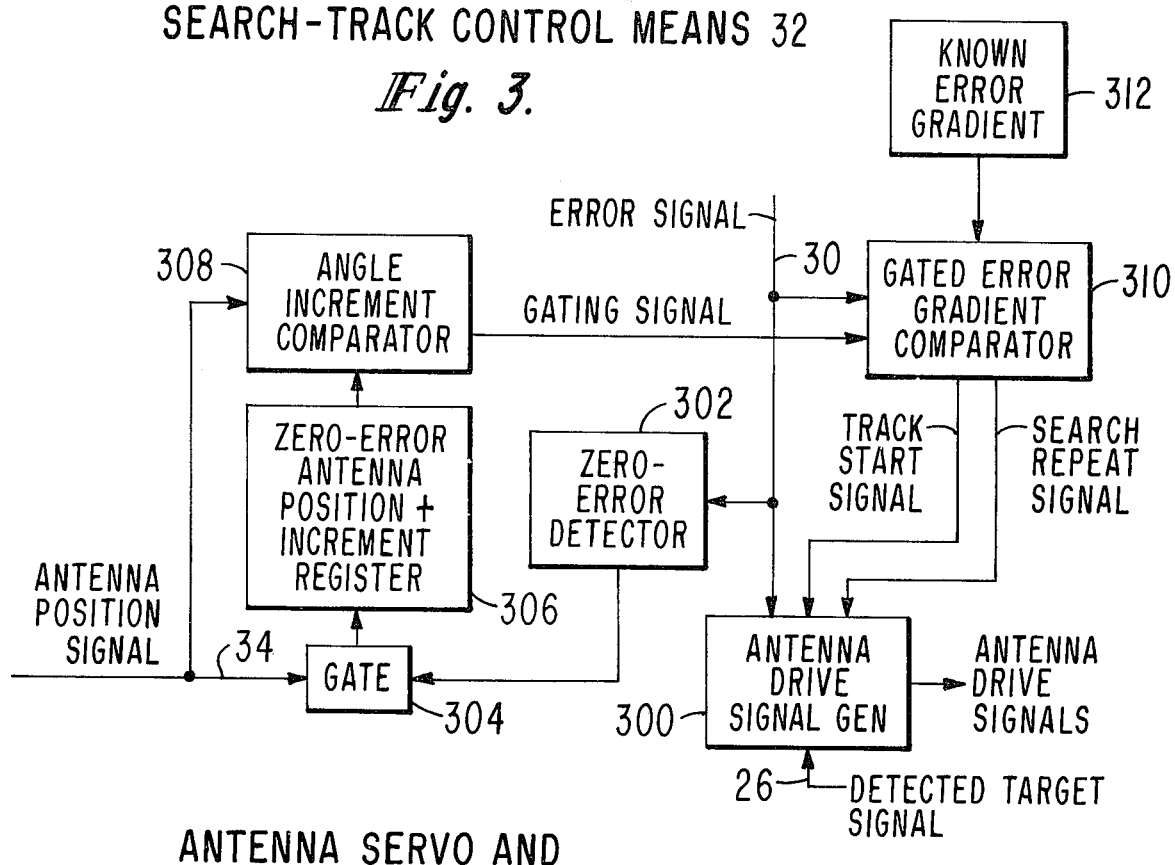
FIG. 3 shows a first modification of the antenna servo and search-track control means of FIG. 1 which incorporates a first embodiment of the present invention.
Figure 4:
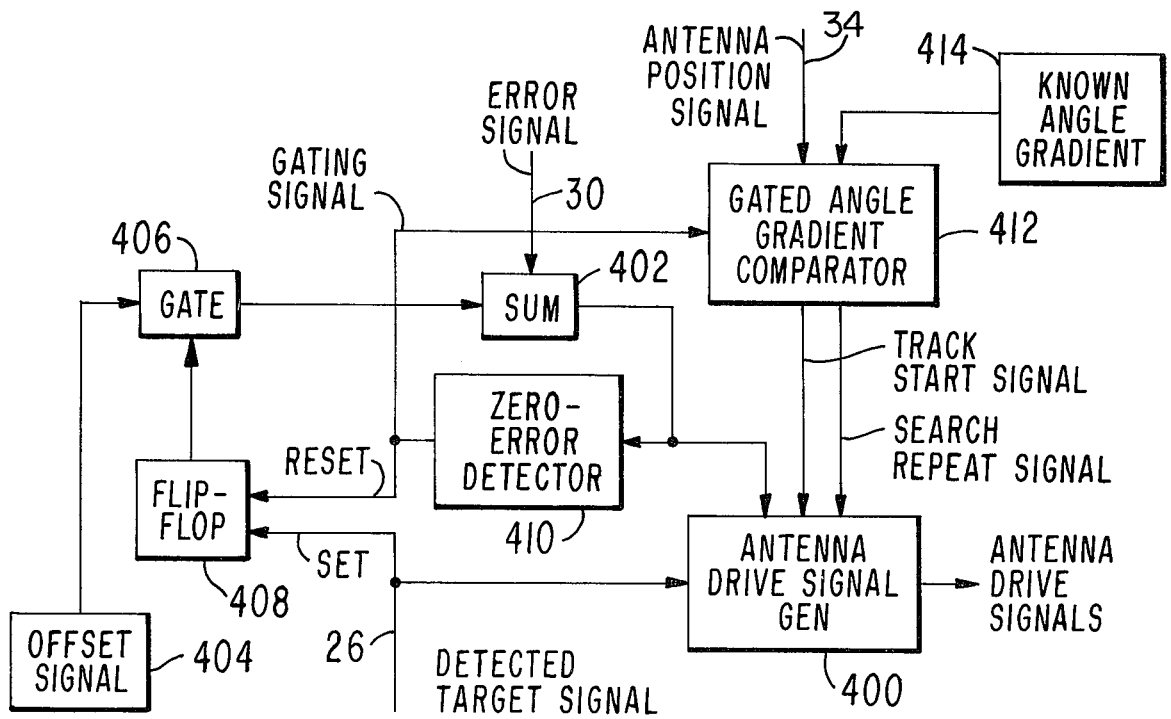
FIG. 4 shows a second modification of the antenna servo and search-track control means of FIG. 1 which incorporates a second embodiment of the present invention.

FIG. 3 illustrates an example of an antenna servo and search-track control means 32 of FIG. 1 which employs error gradient as a discriminant between sidelobe lock on and mainlobe lock on, while FIG. 4 illustrates an antenna servo and search-track control means 32 of FIG. 1 which employs angle gradient as a discriminant between sidelobe and mainlobe lock-on. In both FIGS. 3 and 4, only the portions of the antenna servo and search-track control means 32 which is required to understand the present invention are shown in detail. The remainder of antenna servo and search-track control means 32, which is normally present in a conventional monopulse radar, is included within the antenna drive signal generator block of each of FIGS. 3 and 4.

Referring now to FIG. 3, antenna drive signal generator 300 generates all required antenna drive signals in accordance with its internal programming and the input signals applied thereto. More specifically, antenna drive signal generator 300 initially generates search antenna drive signals which cause the monopulse antenna of block 10 of FIG. 1 to be slewed in azimuth and/or elevation searching for a received target signal. As described with connection to FIG. 1, the picking up of the target by the monopulse antenna will give rise to a detected target signal on connection 26 of sum channel 14, which, as shown in FIG. 3, is applied as an input to antenna drive signal generator 300. The fact that a detected target signal has been initially obtained does not mean that the axis of the monopulse antenna is already pointing directly at the target, but only that the target has entered either the mainlobe or a sidelobe. In response to the receipt of a detected target signal, antenna drive signal generator 300 terminates supplying search-mode antenna drive signals and, instead, supplies antenna drive signals for moving the antenna slowly so that the locked on detected target moves slowly across the lobe. Although this slow movement of the detected target across the lobe may be either in azimuth or elevation (or a particular combination of these two), for the purpose of illustrating the invention, it will be assumed that the antenna drive signal is moving the antenna only in azimuth, so that the error signal shown in FIG. 3 will be assumed to be the azimuth error signal shown in FIG. 1. Of course, in practice, this need not be the case.

The instant that antenna drive signal generator 300 initially locks onto the detected target (by switching the antenna drive signals from the search mode in response to the detected target signal input thereto), the detected target is close to the edge of the illuminating lobe of the antenna pattern. Therefore, the magnitude of the error signal on connection 30 is relatively large at first. However, as the antenna is moved slowly with respect to the locked-on detected target by the antenna drive signals then being applied, the magnitude of the error signal on connection 30, which is applied as an input to both antenna drive signal generator 300 and zero-error detector 302, decreases. Zero-error detector 302 monitors the magnitude of the error signal applied as an input thereto and produces an output therefrom only when the absolute magnitude of this error signal is substantially zero. Therefore, zero-error detector 302 produces an output at the instant that the slowly moving antenna has its axis pointing directly (at least in azimuth) at the target. At this instant, gate 304 is opened and forwards the antenna position signal on connection 34 through to zero-error antenna position plus increment register 306. In response thereto, register 306 does not register the thenexisting antenna position itself, but the sum of the then-existing antenna position plus a given fixed increment (such as unity), which manifests an antenna position a fixed incremental angle beyond that at which zero-error was detected by zero-error detector 302. The output from register 306 is applied as a first input to angle increment comparator 308, while the antenna position signal present on connection 34 is applied as a second input to angle increment comparator 308.

After reaching its zero error position, the antenna continues to move slowly in response to the antenna drive signal then being applied thereto, so that the error signal on connection 30 starts to rise from zero and the antenna position manifested by the antenna position signal on connection 34 aproaches the value registered in register 306. The error signal on connection 30 is applied as a first input to normally disabled gated error gradient comparator 310 which receives a known error gradient 312 as a second input thereto. Known error gradient 312 is assumed to be the error gradient of the mainlobe when the angular offset is equal to the increment of register 306.

In response to the antenna position signal on connection 34 reaching a value equal to that registered in register 306, angle increment comparator 308 applies a gating signal to gated error gradient comparator 310 which enables gated error gradient comparator 310 to compare the then-existing value of the error signal on connection 30 with the known error gradient from block 312. If, as desired, main lobe lock-on has been achieved, the magnitude of the error signal will be equal to that of the known error gradient of the mainlobe from block 312. Therefore, in this case, gated error gradient comparator 310 applies a track start signal to antenna drive signal generator 300, which switches antenna drive signal generator to its track mode of operation. In this track mode of operation, antenna drive signal generator 300 derives the antenna drive signals from the output of servo means responsive to both the azimuth error signal on connections 30 and the elevation error signal (not shown) applied thereto, as is conventional. When in its track mode, antenna drive signal generator 300 is not responsive to outputs from gated error gradient comparator 310.

In the case where the comparison of the error signal with the known error gradient of the mainlobe indicates that the magnitude of the error signal is unequal to this known error gradient, manifesting sidelobe lock on, gated error gradient comparator 310 applies a search repeat signal to antenna drive signal generator 300 which causes antenna drive signal generator 300 to switch back to the search mode for deriving antenna drive signals. The entire process, described above, is then repeated as many times as required until mainlobe lock-on occurs and a track start signal is applied to antenna drive signal generator 300, as described above. In this manner, the apparatus of FIG. 3 makes use of the difference in error gradients between the mainlobe and sidelobe to achieve mainlobe lock-on.

The apparatus of FIG. 4 employs the angle gradient rather than the error gradient, to achieve mainlobe lock-on. In particular, antenna drive signal generator 400 remains in its search mode until a detected target signal on connection 26 occurs and is applied as an input thereto. In response to this detected target signal, generator 400 is switched to a mode in which the antenna drive signals are obtained from the output of servo means having an error signal from the output of sum circuit 402 applied as an input thereto. The output from sum circuit 402 consists of the sum of the error signal on connection 30, applied at the first input thereto, and a fixed incremental offset signal from gate 406 applied as a second input thereto. The output from sum circuit 402 is equal to the sum of the signals applied to first and second inputs thereof. Error signal 30 is continuously applied to the first input of sum circuit 402, but the offset signal from block 404 is applied as a second input to sum circuit 402 only when gate 406 is enabled.

The occurrence of a detected target signal on connection 26, besides switching antenna gate signal generator 400 from its search mode, is also effective in setting flip-flop 408. When flip-flop 408 is set, gate 406 is enabled and offset signal 404 is applied as a second input to sum circuit 402. This results in the monopulse antenna being moved by the antenna drive signals from the output of the servo means of antenna drive signal generator 400 until the output from sum circuit 402 is substantially zero. At this time, the error signal on connection 30 is equal in magnitude but opposite in polarity to that of offset signal 404. Thus, the absolute magnitude of offset signal 404 is set to a given incremental value which is assumed by the error signal on connection 30 only when the output from sum circuit 402 is substantially zero.

In response to the output from sum circuit 402 becoming substantially zero, zero-error detector 410 produces an output that both resets flip-flop 408 and is applied as a gating signal to normally disabled gated angle-gradient comparator 412. When enabled by the presence of this gating signal, gated angle-gradient comparator 412 compares the then-existing antenna position manifested by the antenna position signal on connection 34 applied at a first input thereto with the known angle gradient 414 of the mainlobe required to produce an error signal of a magnitude corresponding to that of offset signal 404. If the comparison of the antenna position signal with the known angle gradient shows them to be substantially equal, desired mainlobe lock-on has been achieved, and in this case, a track start signal is applied to antenna drive signal generator 400. The resetting of flip-flop 408 closed gate 406 and removed offset signal 404 as a second input to sum circuit 402. Therefore, the output from sum circuit 402 is now the error signal on connection 30 itself. Thus, the antenna now tracks the target without offset.

If the antenna position signal is not equal to known angle gradient 414 when comparator 412 is enabled, indicating sidelobe lock-on, comparator 412 applies a search repeat signal to antenna drive signal generator 400, causing generator 400 to switch back to search mode. The whole process, described above, is then repeated as many times as is required until comparator 412 indicates that mainlobe lock-on has taken place. At this time, a track start signal is applied to antenna drive signal generator 400.

The apparatus shown in each of FIGS. 3 and 4 is only illustrative of the type of apparatus which may be employed for automatically performing the method of using the angle-error gradient as a discriminant for achieving mainlobe lock-on, rather than sidelobe lock-on, in a monopulse radar. Not only will other apparatus for performing this method be apparent to one skilled in the art, but the method could be practiced manually, rather than automatically, so long as the actual angle-error gradient can be measured and the angle-error gradient of the mainlobe and/or the sidelobe is known a priori.

What is claimed is:

1. An operating method for a search-track monopulse radar having a mainlobe antenna pattern exhibiting a first angle-error gradient and a sidelobe antenna pattern exhibiting a second angle-error gradient different from said first angle-error gradient, at least one of said first and second angle-error gradients being known; said method comprising the steps of:
    a. operating said radar in a search mode until said radar locks onto a detected target, and then
    b. measuring the actual angle-error gradient of said locked-on target to indicate whether said target is locked on to said mainlobe or is locked on to said sidelobe.

2. The method defined in claim 1, further including the alternative steps of:
    c. operating said radar in a track mode in response to said measurement of said actual angle-error gradient indicating that said target is locked on to said mainlobe, or
    d. repeating steps a) and b) in response to said measurement of said actual angle-error gradient indicating that said target is locked on to said sidelobe.

3. The method defined in claim 1, wherein step (b) includes the steps of:
    c. moving the pointing direction of the antenna axis of said monopulse radar a given angular increment with respect to said locked-on target to thereby produce a tracking error signal having a magnitude manifesting actual error gradient with respect to angle; and
    d. comparing said tracking error signal with a known one of said angle-error gradients to provide an indication of whether said radar is locked on to said mainlobe or is locked on to said sidelobe in accordance with said comparison.

4. The method defined in claim 1, wherein step (b) includes the steps of:
    c. introducing an incremental offset signal in the antenna servo loop of said monopulse radar to move the pointing direction of the antenna axis thereof by that angle which produces a given tracking error signal proportional to said incremental offset signal,
    d. measuring said angle of movement in said pointing direction to derive a signal manifesting actual angle gradient with respect to error; and
    e. comparing said derived signal with a known one of said angle-error gradients to provide an indication of whether said radar is locked on to said mainlobe or is locked on to said sidelobe in accordance with said comparison.

* * * * *